United States Patent [19]

Seyed-Bolorforosh et al.

[11] Patent Number: 5,797,846

[45] Date of Patent: Aug. 25, 1998

[54] METHOD TO CONTROL FRAME RATE IN ULTRASOUND IMAGING

[75] Inventors: Mir Said Seyed-Bolorforosh. Brookfield; Michael J. Washburn. New Berlin; David D. Becker. Milwaukee, all of Wis.

[73] Assignee: General Electric Company. Milwaukee, Wis.

[21] Appl. No.: 774,665

[22] Filed: Dec. 30, 1996

[51] Int. Cl.$^6$ ....................................................... A61B 8/00
[52] U.S. Cl. ....................................................... 600/447
[58] Field of Search ........................ 128/660.01, 660.07, 128/661.01; 73/625–626; 600/437, 443, 447; 367/7, 103

[56] References Cited

U.S. PATENT DOCUMENTS

| | | | |
|---|---|---|---|
| 4,582,065 | 4/1986 | Adams | 128/661.01 |
| 4,665,924 | 5/1987 | Saito et al. | 128/661.01 |
| 5,318,033 | 6/1994 | Savord | 128/661.01 |
| 5,379,642 | 1/1995 | Reckwerdt et al. | 73/625 |
| 5,438,994 | 8/1995 | Starosta et al. | 128/661.01 |
| 5,509,415 | 4/1996 | Saunders et al. | 128/660.07 |
| 5,549,111 | 8/1996 | Wright et al. | 128/661.01 |

*Primary Examiner*—Francis Jaworski
*Attorney, Agent, or Firm*—Dennis M. Flaherty; John H. Pilarski

[57] ABSTRACT

A method for optimizing the beam distribution to obtain the highest frame rate together with the least amount of acoustic noise while limiting the spatial aliasing to an acceptable level. The beam distribution is adjusted according to the scan format and as a function of the beam width, which is proportional to the product of the F number and the operating wavelength. As the F number changes in going from the shallow depth to a deeper depth, the number of beams fired to construct an image would change correspondingly. In addition, if the F number is changing in going from the center of image to the edge of the image, the separation of the fired beams would change. Alternatively, if the operating frequency is being changed in going from shallower depths to deeper depths or in going from the center of image to the edge of the image, the beam spacing is changed in order to fire the optimum number of beams at all times, and thereby obtain the highest frame rate. Another variation is to have a beam distribution which depends on the spatial resolution of the display unit. For a sector scan, the number of beams which are fired at the shallower depths can be made smaller than the number of beams fired at the deeper depths. Once the beam distribution has been defined, the sequencing of beam firings must be determined to maximize the frame rate.

10 Claims, 6 Drawing Sheets

METHOD TO CONTROL FRAME RATE IN ULTRASOUND IMAGING

FIELD OF THE INVENTION

This invention generally relates to ultrasound imaging of human tissue and blood. In particular, the invention relates to a method for obtaining a high frame rate while minimizing acoustic noise and limiting spatial aliasing to an acceptable level in an ultrasound image.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred beam direction and is focused at a selected range along the beam. Multiple firings may be used to acquire data representing the desired anatomical information along a multiplicity of scan lines. The beam-forming parameters of each of the firings may be varied to provide a change in the position of focus or otherwise change the spatial position of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer. The reflected ultrasound is sampled from the focal zones of two or more beams focused at different depths along the same scan line. For each steering angle, the sampled data from contiguous focal zones is acquired and then spliced to make one vector or A-line. A multiplicity of vectors, one for each beam focal point, are used, along with interpolated data values, to operate the pixels on the display monitor to form a full image frame.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along a scan line. The receiver is dynamically focused at a succession of ranges or depths along the scan line as the reflected ultrasonic waves are received.

In an ultrasound imaging system, the beam spacing for an optimum image is determined by the beam width or lateral point spread function. The lateral point spread function is determined by the product of the wavelength and the F number. The wavelength is in turn a function of the transmit waveform center frequency and the receiver demodulation frequency. The F number equals the focal depth divided by the aperture.

The number of beams fired is determined by the spatial sampling requirements and the desired frame rate. Frame rate is inversely proportional to the time taken to transmit and receive all the beams required to form a complete frame of data. High frame rates are required to minimize the possible motion-induced errors in the image. In order to maintain a high frame rate the number of beams is kept to the minimum which would satisfy the Nyquist spatial sampling requirement. When fewer beams are fired than minimum spatial sampling requirements, spatial aliasing occurs. At the optimum spatial sampling the highest resolution is obtained together with the highest frame rate. There is a need for a method for meeting the spatial sampling requirements based on the beam characteristics at various positions in a given two- or three-dimensional image. In addition, there is a need for means to reduce the amount of acoustic noise introduced at higher frame rates, and means to control the beam distribution (user ability to select high frame rate or high resolution) to optimize the image for spatial aliasing. This is dependent on the clinical application or the clinical examination type.

SUMMARY OF THE INVENTION

The present invention is a method for optimizing the beam distribution to obtain the highest frame rate together with the least amount of acoustic noise while limiting the spatial aliasing to an acceptable level. The invention has application in B-mode imaging, color flow imaging, and other scanned imaging modes.

In accordance with a preferred embodiment of the invention, the beam distribution is adjusted according to the scan format and as a function of the beam width. The beam width is proportional to the product of the F number and the operating wavelength. In accordance with the operation of this embodiment, as the F number changes in going from a shallow depth to a deeper depth, the number of beams fired to construct an image would change correspondingly. In addition, if the F number is changing in going from the center of image to the edge of the image, the number of beams fired would change. Alternatively, if the operating frequency is being changed in going from shallower depths to deeper depths or in going from the center of image to the edge of the image, the beam spacing is changed in order to fire the optimum number of beams at all times, and thereby obtain the highest frame rate.

In most ultrasound images the F number increases in going from the center of the image to the edge due to the finite number of elements in the transducer array, the F number increases with depth in the image due to the limited transducer apertures, and the center frequency of the image information decreases with depth due to frequency-dependent attenuation in the body. To account for these changes in spatial resolution throughout the image, a function which can be a linear, parabolic, semicircular or trigonometric function can be used to define the beam distribution throughout the image. Other functions can be used depending on the application.

Another variation is to have a beam distribution which depends on the spatial resolution of the display unit. For a sector scan, due to the finite spatial resolution of the display unit, the number of beams which are fired at the shallower depths can be made smaller than the number of beams fired at the deeper depths.

Once the beam distribution has been defined, the sequencing of beam firings must be determined to maximize the frame rate. Under high frame rates the acoustic noise from the previous firing can introduce acoustic noise into the next firing. In accordance with the present invention, various methods can be employed to reduce acoustic noise.

If fewer than the minimum number of beams determined by spatial sampling requirements are used to construct an image, aliasing would be observed in the image. In many ultrasound imaging situations, the degree to which spatial aliasing is apparent in the image is highly tissue dependent. In these cases, means must be provided to the user for adjusting the beam density to optimize the frame rate versus desired resolution and spatial aliasing. In order to reduce the effect of this aliasing at very high frame rates, the following solution was adopted. For a sector type of scan such as those obtained from phased array, curved array or linear array transducers, the scanned region is divided into a number of azimuthal segments of equal or unequal width. The number of beams in each segment is decimated depending on the required frame rate. The decimation results in a reduction in the total number of vectors fired. This decimation is different for different segments. Typically there is more decimation at the edge of the image compared to the center of the image, since the region of interest is typically located at the center of the image.

BRIEF DESCRIPTION OF THE DRAWINGS

FIG. 3B also shows typical aperture sizes for beams at the center and on the side of the image, respectively.

DETAILED DESCRIPTION OF THE PREFERRED EMBODIMENTS

Figure 1:
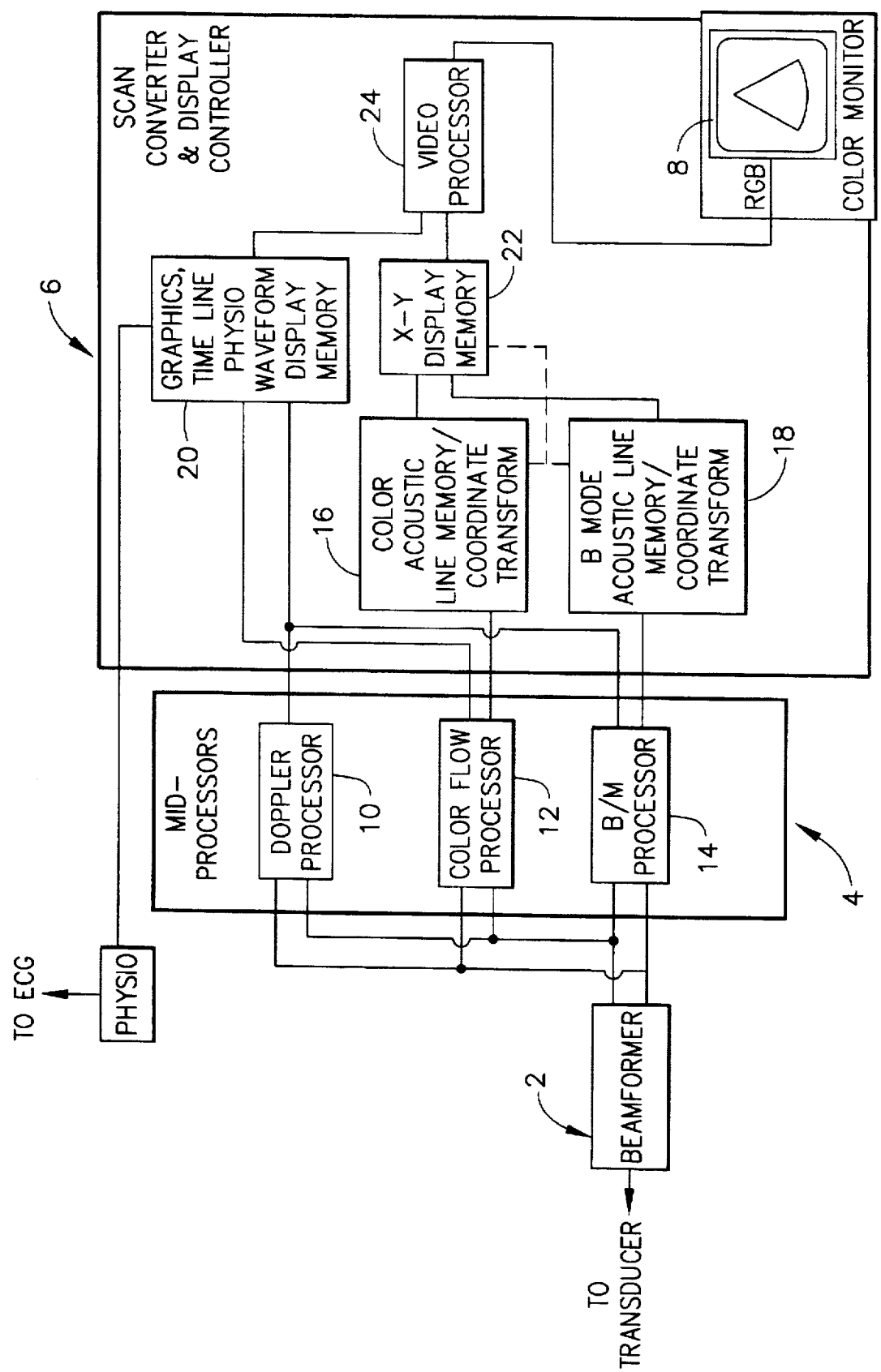
FIG. 1 is a block diagram showing the major functional blocks of a real-time ultrasound imaging system.

The present invention is incorporated in an ultrasound imaging system consisting of four main subsystems: a beamformer 2, processors 4 (including a separate processor for each different mode), a scan converter/display controller 6 and a kernel 8. System control is centered in the kernel 8, which accepts operator inputs through an operator interface 10 and in turn controls the various subsystems. The master controller 12 performs system level control functions. It accepts inputs from the operator via the operator interface 10 as well as system status changes (e.g., mode changes) and makes appropriate system changes either directly or via the scan controller. The system control bus 14 provides the interface face from the master controller to the subsystems.

The scan control sequencer 16 provides real-time (acoustic vector rate) control inputs to the beamformer 2, system timing generator 24, processors 4 and scan converter 6. The scan control sequencer 16 is programmed by the host with the vector sequences and synchronization options for acoustic frame acquisitions. Thus, the scan control sequencer controls the beam distribution and the beam density. The scan converter broadcasts the beam parameters defined by the host to the subsystems via scan control bus 18.

The main data path begins with the analog RF inputs to the beamformer 2 from the transducer 20. The beamformer 2 outputs two summed digital baseband I,Q receive beams formed from spliced data samples, which are in turn derived from the reflected ultrasound from respective focal zones of the transmitted beams. The I,Q data is input to a processor 4, where it is processed according to the acquisition mode and output as processed vector data to the scan converter/display processor 6. The scan converter accepts the processed vector data, interpolates where necessary, and outputs the video display signals for the image to a color monitor 22. The displayed image is a sector scan representing the tissue and/or blood flow in a plane through the body being imaged.

In accordance with the broad concept of the present invention, the beam distribution can be determined as a function of the F number, the transmit waveform center frequency, the receiver demodulation frequency or the beam width. This dependency can be on any one of these parameters or a combination thereof, with a corresponding weight attached to each of these parameters. In addition, the beam distribution can be dependent on the apodization or window shading function.

Figure 2:
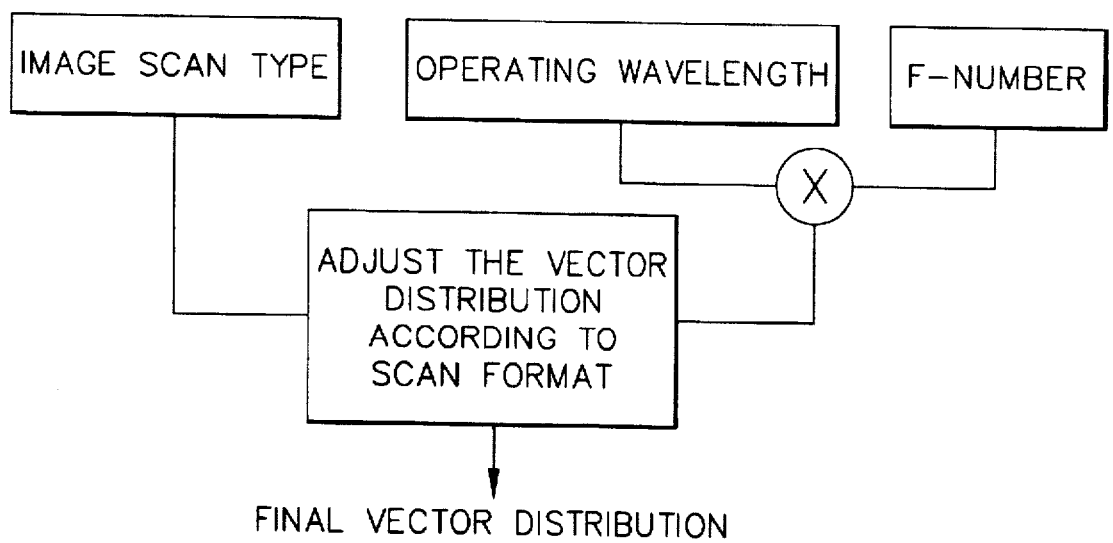
FIG. 2 is a flowchart showing the interaction of parameters that influence the beam distribution in accordance with a preferred embodiment of the invention.
Figure 3A:
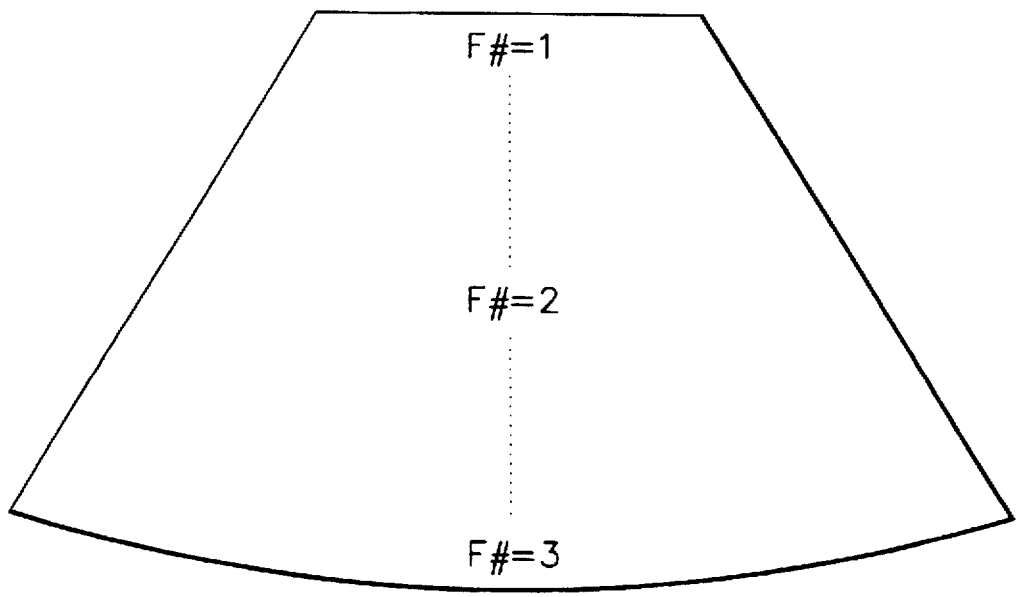
FIGS. 3A and 3B show typical F number distributions along the longitudinal and azimuthal axes, respectively.
Figure 3B:
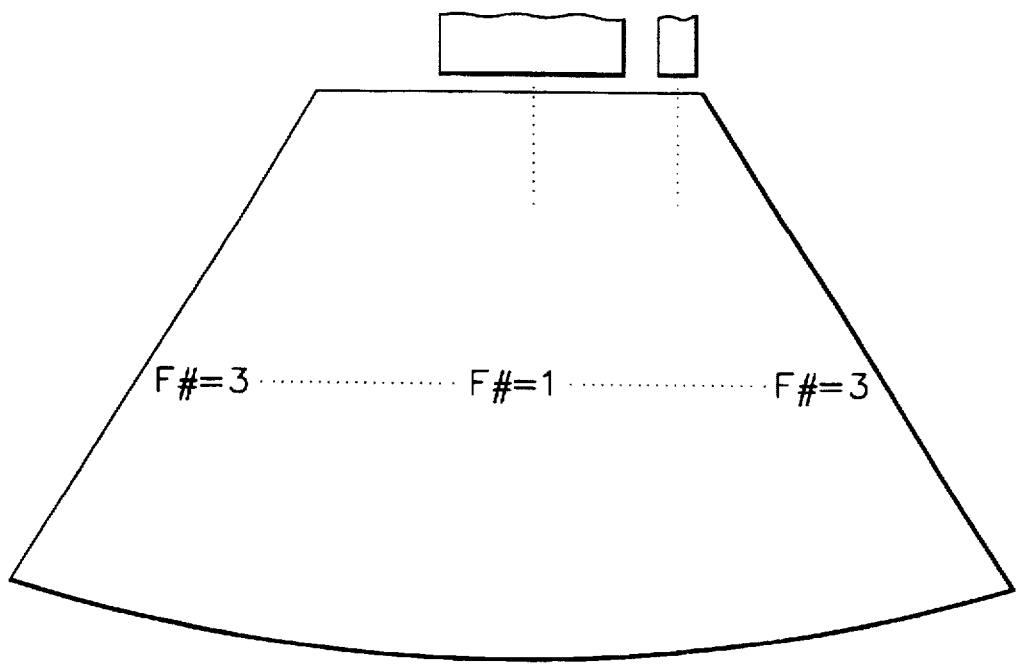

In accordance with a first preferred embodiment of the invention depicted in FIG. 2, the beam distribution is adjusted according to the scan format and as a function of beam width. The beam width is proportional to the product of the F number and the operating wavelength. The operating wavelength is in turn dependent on the transmit waveform center frequency and the receiver demodulation frequency. In accordance with the operation of the first preferred embodiment, as the F number changes in going from the shallow depth to a deeper depth (as shown in FIG. 3A), the number of beams fired to construct an image would change correspondingly. Hence the number of beams is inversely proportional to the F number. In addition, if the F number is changing in going from the center of image to the edge of the image (as shown in FIG. 3B), the number of beams fired would change.

Figure 4A:
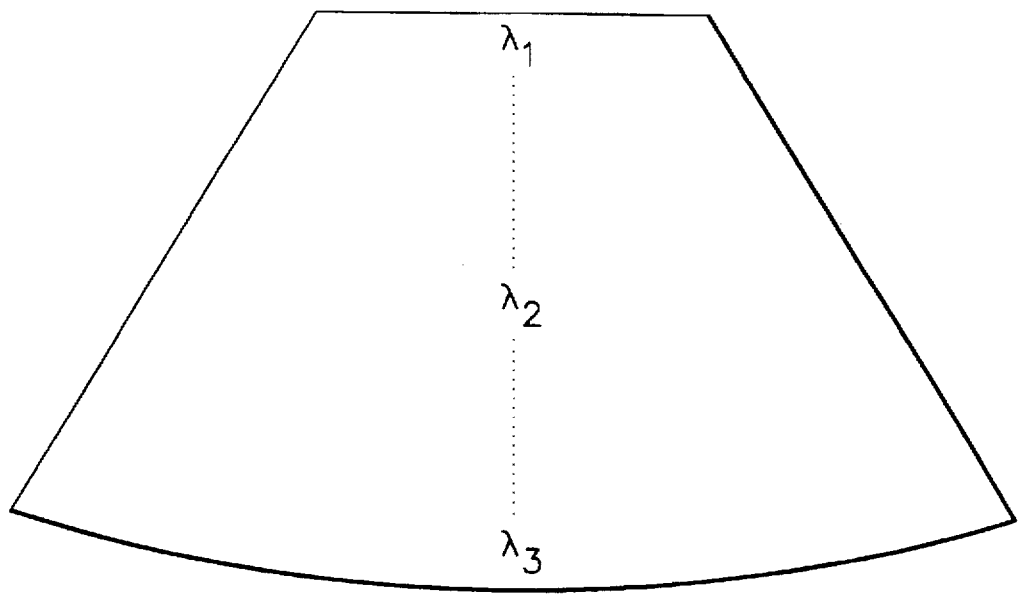
FIGS. 4A and 4B show typical wavelength distributions along the longitudinal and azimuthal axes, respectively, where $\lambda_1 < \lambda_2 < \lambda_3$.
Figure 4B:
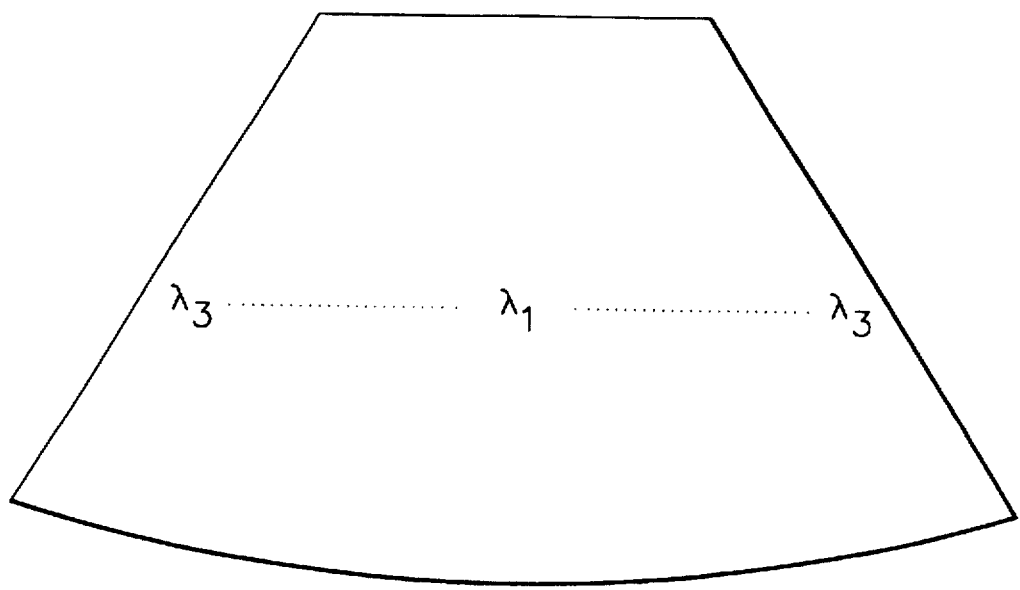

In accordance with another preferred embodiment of the invention, the wavelength or center frequency of the transmit waveform is adjusted during scanning for each image frame. For example, if the operating frequency is being changed in going from shallower depths to deeper depths (as shown in FIG. 4A) or in going from the center of image to the edge of the image (as shown in FIG. 4B), the beam spacing is changed in order to fire the optimum number of beams at all times, and thereby obtain the highest frame rate. In one exemplary embodiment, the operating frequency varies from 9 MHz at the shallowest depth to 6 MHz at the deepest depth, and varies from 7 MHz to 6 MHz from the center to the edge of the image frame at the deepest depth. In this example the number of vectors would vary linearly with the operating frequency. For example, when operating at 9 MHz the vector density is 5 vectors/mm. However, when operating at 6 MHz the vector density would be 3 vectors/mm.

Figure 6:
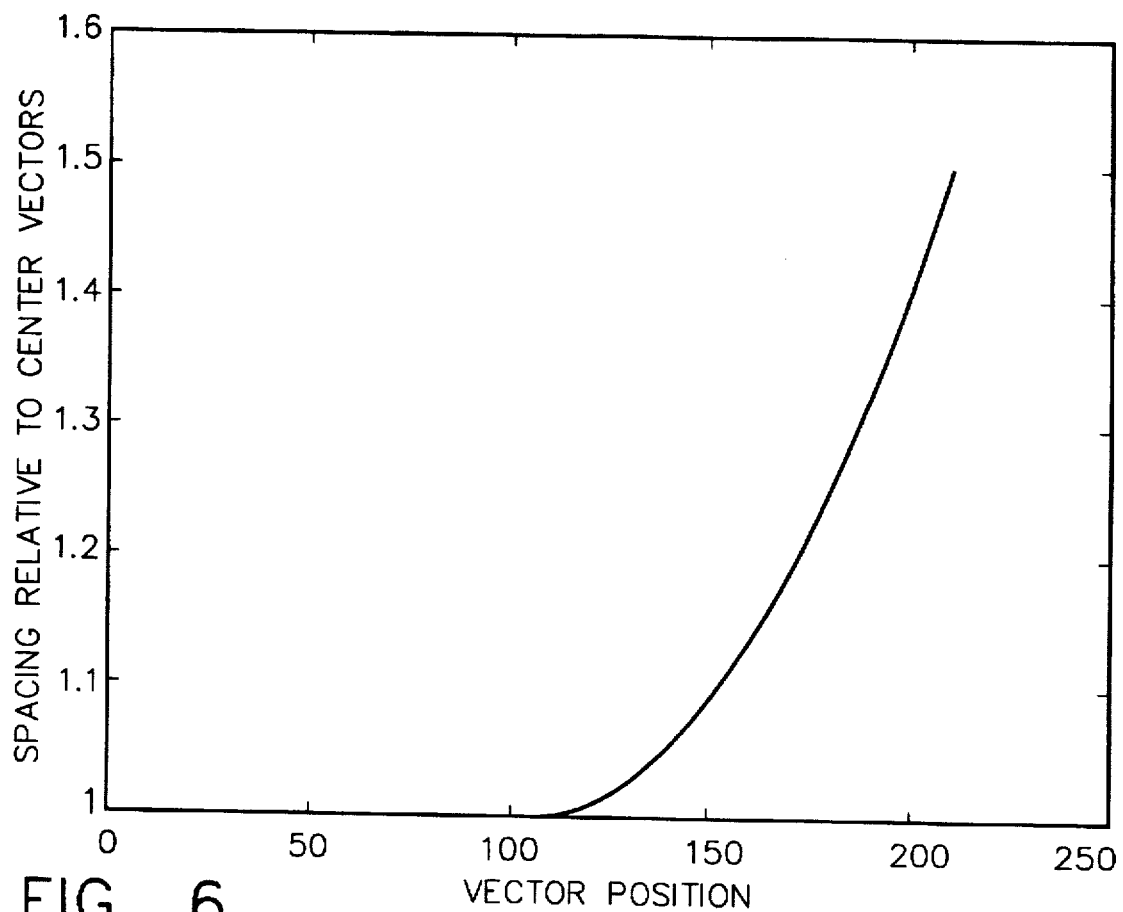
FIG. 6 is a typical beam distribution for a linear transducer array with rectangular scan format.
Figure 5:
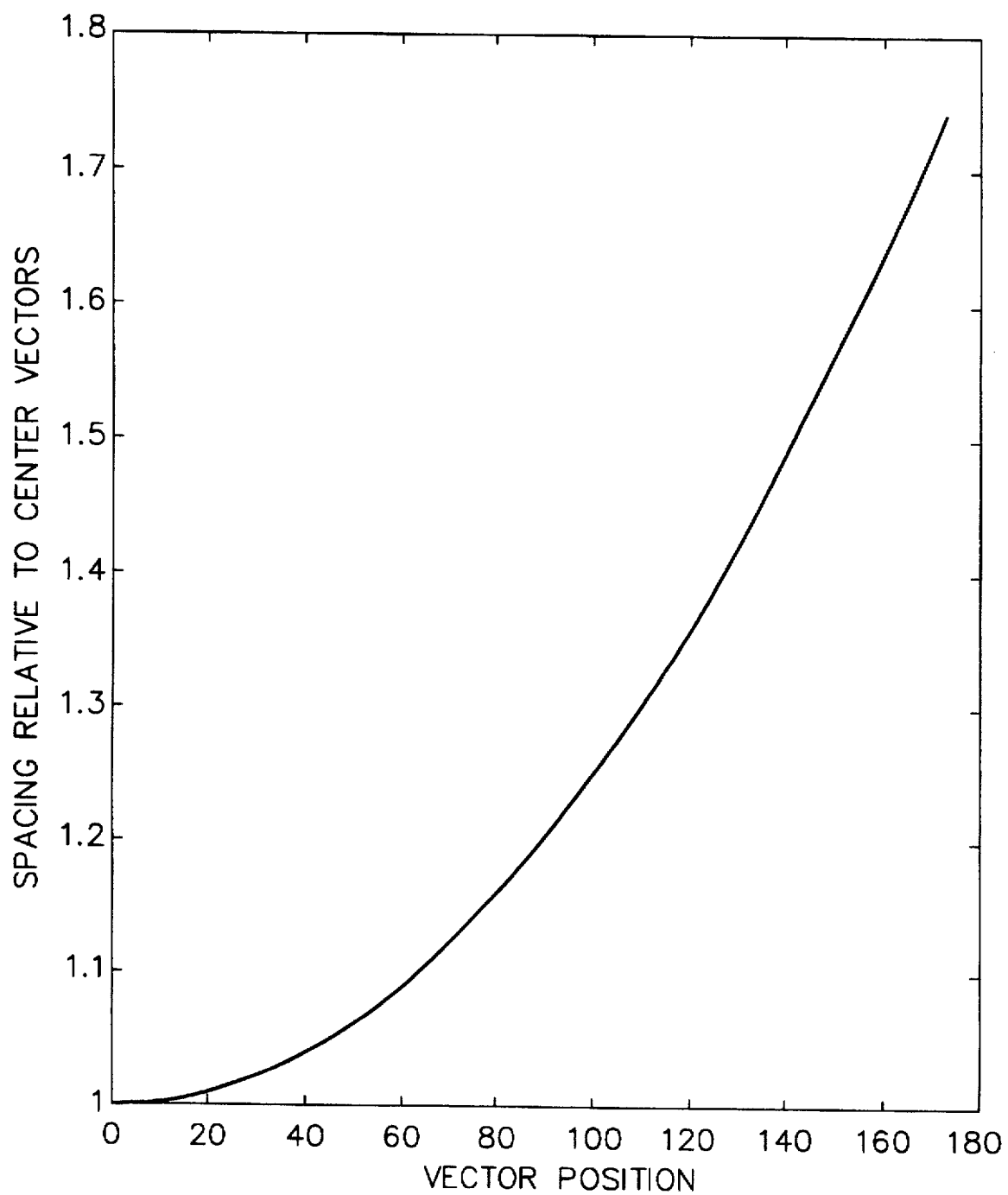
FIG. 5 is a typical beam distribution for a curved transducer array with sector scan format. The number of beams is 345. The beam spacing relative to the center beam is a parabolic function.

In most ultrasound images the F number increases in going from the center of the image to the edge due to the finite number of elements in the transducer array, the F number increases with depth in the image due to the limited transducer apertures, and the center frequency of the image information decreases with depth due to frequency-dependent attenuation in the body. To account for these changes in spatial resolution throughout the image, a function which can be a linear, parabolic, semicircular or trigonometric function can be used to define the beam distribution throughout the image. Other functions can also be used. FIG. 5 shows a typical beam distribution for a curved transducer array with sector scan format in accordance with one preferred embodiment; FIG. 6 shows a typical beam distribution for a linear transducer array with rectangular scan format in accordance with another preferred embodiment.

Figure 7:
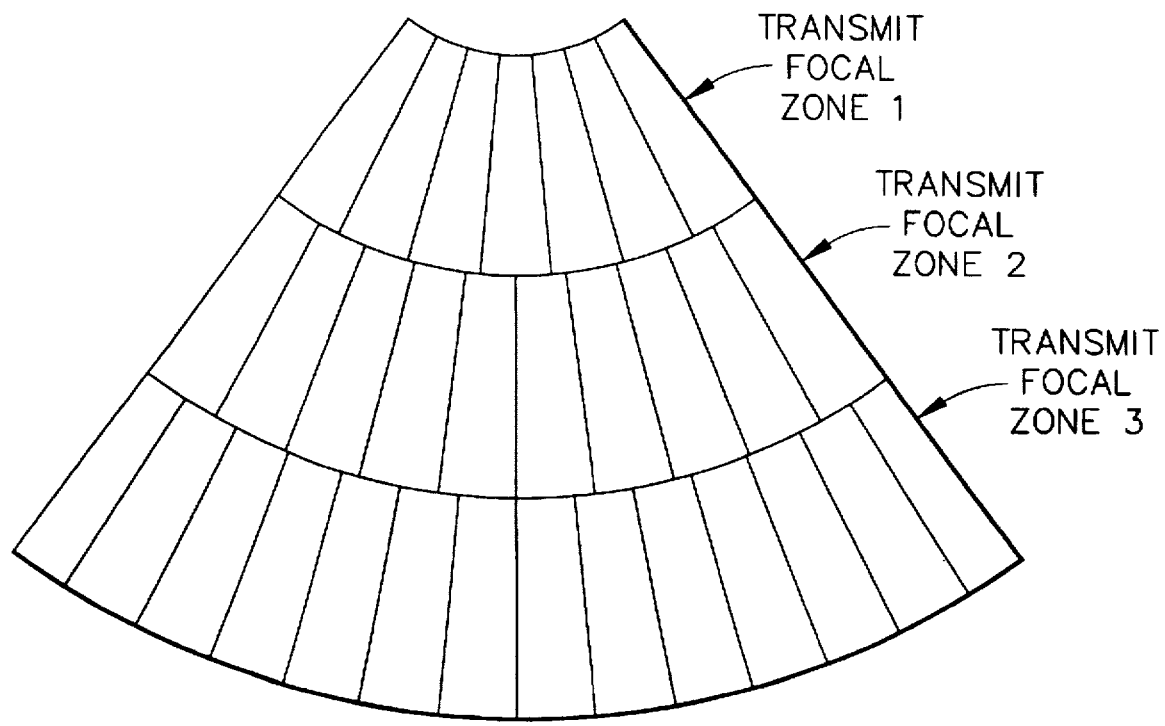
FIG. 7 is a schematic drawing showing a typical transmit focal zone distribution for a sector scan for a constant beam density distribution in the azimuthal direction.

Another variation is to have a beam distribution which depends on the spatial resolution of the display unit. For a sector scan, due to the finite spatial resolution of the display unit, the number of beams which are fired at the shallower depths can be made smaller than the number of beams fired at the deeper depths. This is caused by the smaller arc length at the shallower depths, which requires fewer spatial samples compared to the deeper depths with larger arc length, which requires a larger number of spatial samples. Hence there are a smaller number of beams fired at the shallower depths compared to the deeper depths for any sector type scan, as depicted in FIG. 7. In a specific example, the beam spacing for each focal zone may be approximately constant. Furthermore, as the display depth of the image is changed, the spatial resolution of the display unit changes with respect to the image data. Hence, the number of beams used to form an image must be changed as the display depth is changed.

Once the beam distribution has been defined, the sequencing of beam firings must be determined to maximize the frame rate. Under high frame rates the acoustic noise from the previous firing can introduce acoustic noise into the next firing. In order to reduce this acoustic noise, any one or more of the following four measures can be taken. First, the firing sequence is adjusted such that the longest beam, which corresponds to the deepest depth, is fired first, followed by the second deepest beam, then the third deepest beam and so forth until the shallowest beam has been fired. This would result in lower acoustic noise. The reduced acoustic noise is proportional to the depth difference between successive beams along a scan line. Second, the beams can be fired in a non-sequential manner. Hence each successive firing has a steering angle which is significantly different than the steering angle of the previous firing in order to reduce the amount of acoustic noise. For example, instead of successive firings having sequentially incremented steering angles of 2°, 4°, 6°, etc., the successive firings in accordance with the present invention have steering angles of 0°, 10°, 2°, 12°, 4°, 14°, 5°, 15°, etc., respectively. One other type of acoustic noise which was minimized was the acoustic signal from the last firing, which shows up on the first firing. The noise was reduced by having a longer wait time for the deepest beam when firing the shallower beams first and deeper beams last. The fourth method is to interleave acoustic beams with different demodulation frequency or transmit frequency such that their frequency is separated in order to reduce the acoustic energy from one zone getting into the other zones.

Figure 8:
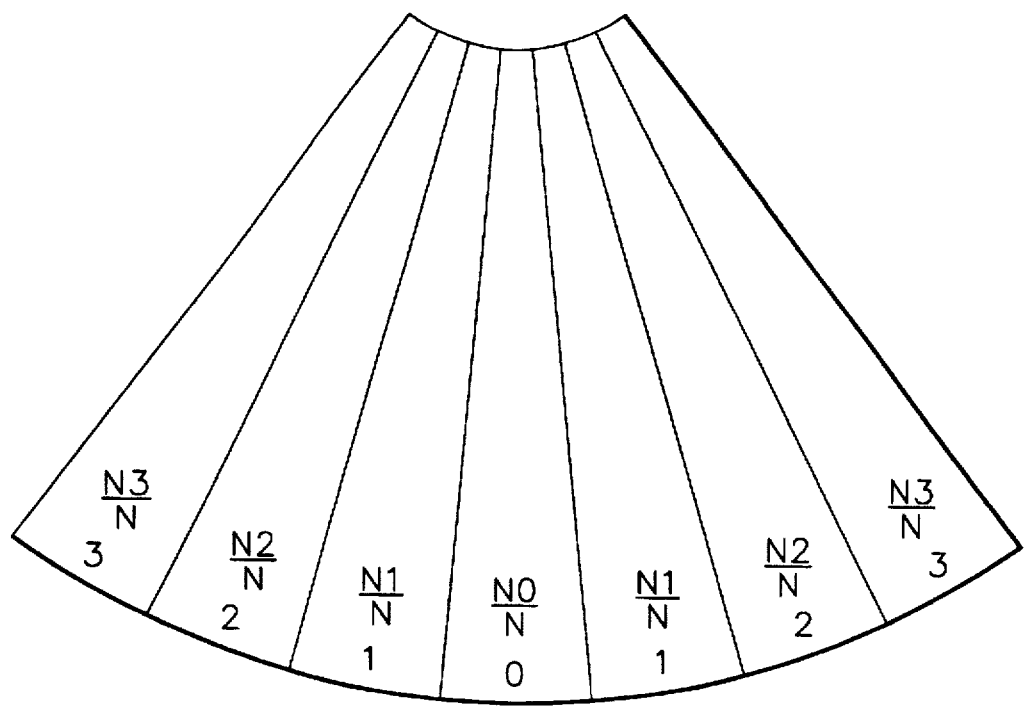
FIG. 8 is a schematic drawing showing azimuthal beam decimation regions for a sector scan, where $N_i/N$ is the decimation ratio for region i.
Figure 1:
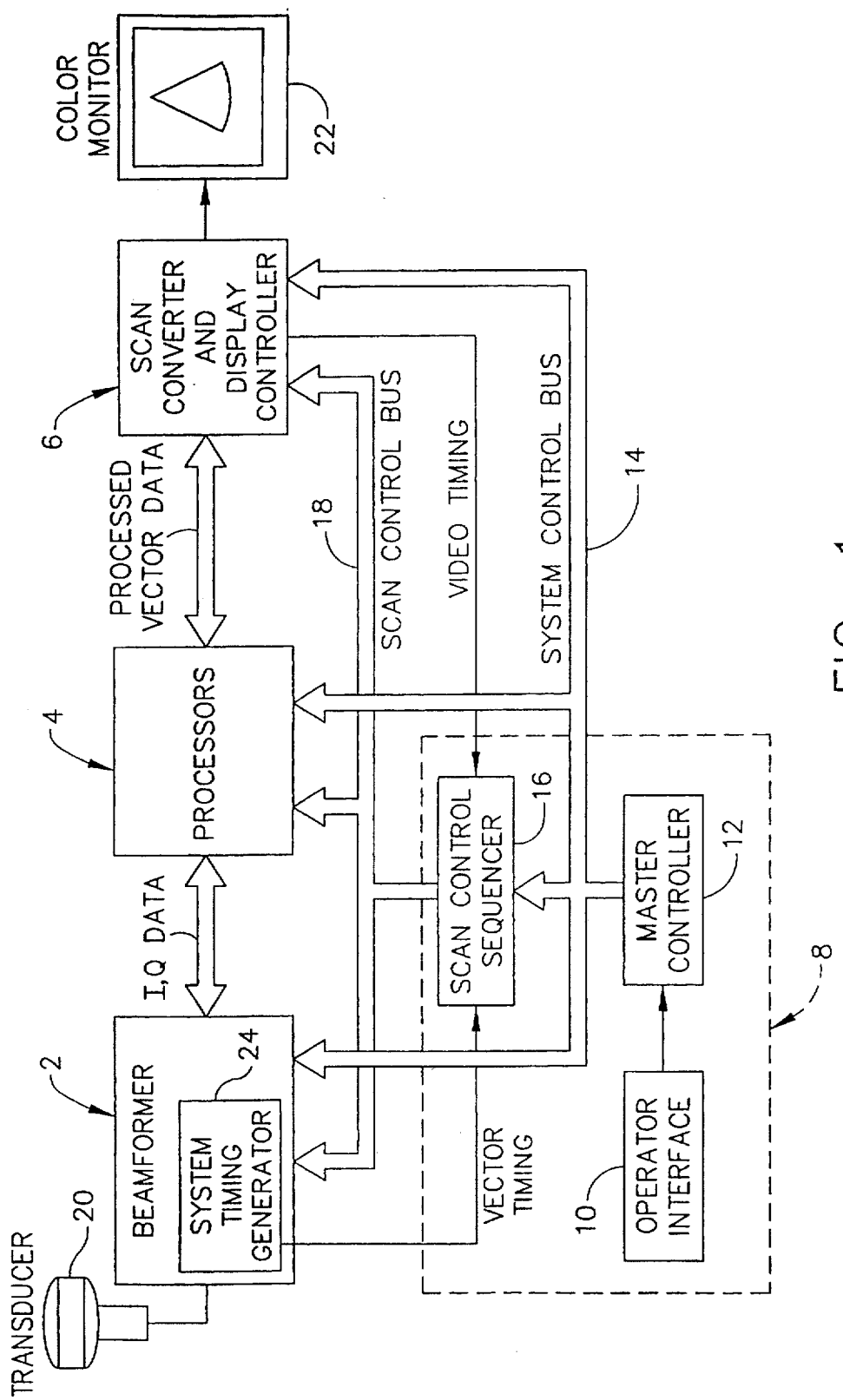

If fewer than the minimum number of beams determined by spatial sampling requirements are used to construct an image, aliasing would be observed in the image. In many ultrasound imaging situations, the degree to which spatial aliasing is apparent in the image is highly tissue dependent. In these cases a means must be provided to the user to adjust the beam density to optimize the frame rate versus desired resolution and spatial aliasing. In order to reduce the effect of this aliasing at very high frame rates, the following solution was adopted. For a sector type of scan such as those obtained from phased array, curved array or linear array transducers, the scanned region is divided into a number of azimuthal segments, as shown in FIG. 8. These segments can have equal or unequal width. The number of beams used in each azimuthal segment is controlled by the user in the following manner. The number of beams in each segment is decimated at a rate of $N_i$:N beams, depending on the required frame rate. This decimation is different for different segments. Typically there is more decimation at the edge of the image compared to the center of the image, since the region of interest is typically located at the center of the image. In this fashion the aliasing would not be a regularly repeated pattern across the image from one segment to the next and within each segment. Using this method the least number of beams can be fired with least effect on the image quality over the region of interest. The decimation is controlled by the user as a compromise between the frame rate versus the resolution. This is controlled by having a key on the control panel to change the decimation rate. This can be further enhanced by linking the frame rate to the dynamic range compression. This dependency is as follows.

The amount of aliasing noticed depends on the display dynamic range. With a small dynamic range the point spread function displayed on the monitor becomes smaller and hence it requires a higher spatial sampling rate compared to a high dynamic range setting. Hence the number of beams fired can be linked to the display dynamic range such that for the higher frame rates with reduced number of beams, the default dynamic range is made larger and vice versa. In this way, the possible aliasing is controlled by the dynamic range level.

In some imaging applications there might be two or more receive beams formed for every transmit beam. These two or more receive beams can be on either side of the transmit beam. This is to improve the frame rate. All the ideas presented here are applicable to this mode of operation.

The foregoing preferred embodiments have been disclosed for the purpose of illustration. Variations and modifications will be readily apparent to those skilled in the art of ultrasonic imaging systems. All such variations and modifications are intended to be encompassed by the claims set forth hereinafter.

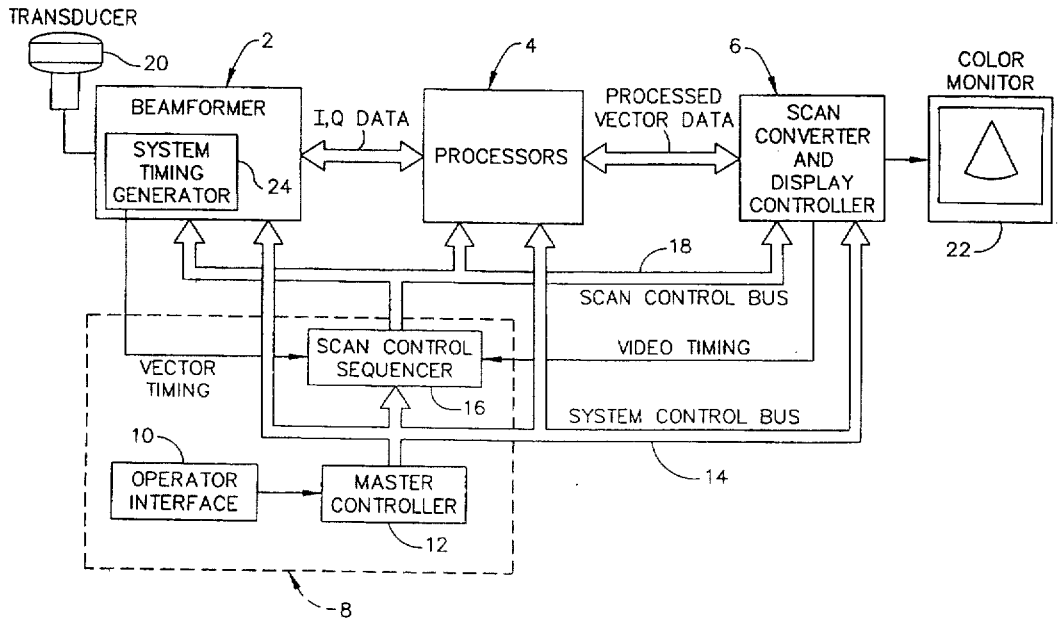

We claim:

1. A method of operating an ultrasound imaging system having a transducer array, comprising the steps of:

transmitting a multiplicity of ultrasound transmit beams from said transducer array in a plane intersecting a mass of ultrasound scatterers, said multiplicity of transmit beams comprising first, second and third sets of transmit beams respectively focused in first, second and third zones in an object being scanned, said second and third zones having a first range of depths, said first zone having a second range of depths less than and not overlapping said first range of depths, said second zone extending over a first range of steering angles centered on a centerline of said transducer array, said third zone extending over a second range of steering angles, said second range of steering angles being greater than and not overlapping with said first range of steering angles, and said first zone extending over a third range of steering angles which overlaps both of said first and second ranges of steering angles;

for each transmit beam, acquiring a respective receive vector derived from ultrasound reflected back to said transducer array by scatterers in said respective zones; and displaying an image frame which is a function of at least said receive vectors, wherein said first set of transmit beams have a first vector density and a first transmit waveform center frequency, said second set of transmit beams have a second vector density and a second transmit waveform center frequency less than said first transmit waveform center frequency, said third set of transmit beams have a third vector density and a third transmit waveform center frequency less than said second transmit waveform center frequency, and said first, second and third vector densities being a function of said first, second and third transmit waveform center frequencies respectively.

2. The method as defined in claim 1, wherein said first, second and third vector densities are substantially linearly proportional to said first, second and third transmit waveform center frequencies respectively.

3. The method as defined in claim 1, wherein said transmit beams of said first, second and third sets are interleaved so that transmit beams of a particular transmit waveform center frequency are separated in time by transmit beams of a different transmit waveform center frequency.

4. A method of operating an ultrasound imaging system having a transducer array, comprising the steps of:

transmitting a multiplicity of ultrasound transmit beams from said transducer array in a plane intersecting a mass of ultrasound scatterers, said multiplicity of transmit beams comprising first and second sets of transmit beams respectively focused in first and second zones in an object being scanned;

for each transmit beam, acquiring a respective receive vector derived from ultrasound reflected back to said transducer array by scatterers in said respective zones; and displaying an image frame which is a function of at least said receive vectors, wherein said first set of transmit beams have a first transmit waveform center frequency, said second set of transmit beams have a second transmit waveform center frequency different than said first transmit waveform center frequency, and said transmit beams of said first and second sets are interleaved so that transmit beams of said first transmit waveform center frequency are separated in time by transmit beams of said second transmit waveform center frequency.

5. A method of operating an ultrasound imaging system having a transducer array, comprising the steps of:

transmitting a multiplicity of ultrasound transmit beams from said transducer array in a plane intersecting a mass of ultrasound scatterers, each of said transmit beams having a respective unique steering angle measured with respect to a centerline extending normal to a midpoint of said transducer array, said multiplicity of transmit beams comprising a first set of transmit beams having positive steering angles and a second set of transmit beams having negative steering angles, each of said first and second sets of transmit beams having a beam spacing which increases with increasing magnitude of the steering angle in accordance with a nonlinear function;

for each transmit beam, acquiring a respective receive vector derived from ultrasound reflected back to said transducer array by scatterers in said respective zones; and displaying an image frame which is a function of at least said receive vectors.

6. The method as defined in claim 5, wherein said nonlinear function is a parabolic function.

7. The method as defined in claim 5, wherein said nonlinear function is a semicircular function.

8. The method as defined in claim 5, wherein said nonlinear function is a trigonometric function.

9. A method of operating an ultrasound imaging system having a transducer array, comprising the steps of:

pressing a key on a control panel to select first and second vector densities, said first vector density being different than said second vector density;

transmitting a multiplicity of ultrasound transmit beams from said transducer array in a plane intersecting a mass of ultrasound scatterers, each of said transmit beams having a respective unique steering angle measured with respect to a centerline extending normal to a midpoint of said transducer array, said multiplicity of transmit beams comprising a first set of transmit beams having steering angles falling within a first azimuthal segment and a second set of transmit beams having steering angles falling within a second azimuthal segment not overlapping with said first azimuthal segment, said first set of transmit beams having said first vector density and said second set of transmit beams having said second vector density;

for each transmit beam, acquiring a respective receive vector derived from ultrasound reflected back to said transducer array by scatterers in said respective zones; and displaying an image frame which is a function of at least said receive vectors.

10. The method as defined in claim 9, further comprising the step of setting a default dynamic range of a display monitor as a function of a frame rate determined by the vector densities selected by a system operator.

* * * * *

UNITED STATES PATENT AND TRADEMARK OFFICE
CERTIFICATE OF CORRECTION

PATENT NO.   : 5,797,846
DATED        : Aug. 25, 1998
INVENTOR(S)  : Mir Said Seyed-Bolorforosh, et al It is certified that error appears in the above-identified patent and that said Letters Patent is hereby corrected as shown below:

The title page, showing the illustrative figure, should be deleted to be replaced with the attached title page.

The drawing sheet, consisting of Fig. 1, should be deleted to be replaced with the drawing sheet, consisting of Fig. 1, as shown on the attached page.

Signed and Sealed this

Twenty-first Day of September, 1999

*Attest:*

Q. TODD DICKINSON

*Attesting Officer*          Acting Commissioner of Patents and Trademarks

United States Patent
Seyed-Bolorforosh et al.

Patent Number: 5,797,846
Date of Patent: Aug. 25, 1998

[54] METHOD TO CONTROL FRAME RATE IN ULTRASOUND IMAGING

[75] Inventors: Mir Said Seyed-Bolorforosh, Brookfield; Michael J. Washburn, New Berlin; David D. Becker, Milwaukee, all of Wis.

[73] Assignee: General Electric Company, Milwaukee, Wis.

[21] Appl. No.: 774,665

[22] Filed: Dec. 30, 1996

[51] Int. Cl.⁶ .................................................. A61B 8/00
[52] U.S. Cl. .......................................................... 600/447
[58] Field of Search ...................... 128/660.01, 660.07, 128/661.01; 73/625–626; 600/437, 443, 447; 367/7, 103

[56] References Cited

U.S. PATENT DOCUMENTS

| | | | |
|---|---|---|---|
| 4,582,065 | 4/1986 | Adams | 128/661.01 |
| 4,665,924 | 5/1987 | Saito et al. | 128/661.01 |
| 5,318,033 | 6/1994 | Savord | 128/661.01 |
| 5,379,642 | 1/1995 | Reckwerdt et al. | 73/625 |
| 5,438,994 | 8/1995 | Starosta et al. | 128/661.01 |
| 5,509,415 | 4/1996 | Saunders et al. | 128/660.07 |
| 5,549,111 | 8/1996 | Wright et al. | 128/661.01 |

*Primary Examiner*—Francis Jaworski
*Attorney, Agent, or Firm*—Dennis M. Flaherty; John H. Pilarski

[57] ABSTRACT

A method for optimizing the beam distribution to obtain the highest frame rate together with the least amount of acoustic noise while limiting the spatial aliasing to an acceptable level. The beam distribution is adjusted according to the scan format and as a function of the beam width, which is proportional to the product of the F number and the operating wavelength. As the F number changes in going from the shallow depth to a deeper depth, the number of beams fired to construct an image would change correspondingly. In addition, if the F number is changing in going from the center of image to the edge of the image, the separation of the fired beams would change. Alternatively, if the operating frequency is being changed in going from shallower depths to deeper depths or in going from the center of image to the edge of the image, the beam spacing is changed in order to fire the optimum number of beams at all times, and thereby obtain the highest frame rate. Another variation is to have a beam distribution which depends on the spatial resolution of the display unit. For a sector scan, the number of beams which are fired at the shallower depths can be made smaller than the number of beams fired at the deeper depths. Once the beam distribution has been defined, the sequencing of beam firings must be determined to maximize the frame rate.

10 Claims, 6 Drawing Sheets